April 5, 1955     D. E. SUNSTEIN     2,705,794
SIGNAL MODIFYING APPARATUS FOR ELIMINATING VARIATIONS
AS A FUNCTION OF ONE OR MORE INDEPENDENT VARIABLES
Filed June 11, 1946     2 Sheets-Sheet 1

INVENTOR.
DAVID E. SUNSTEIN
BY
AGENT

April 5, 1955 D. E. SUNSTEIN 2,705,794
SIGNAL MODIFYING APPARATUS FOR ELIMINATING VARIATIONS
AS A FUNCTION OF ONE OR MORE INDEPENDENT VARIABLES
Filed June 11, 1946 2 Sheets-Sheet 2

INVENTOR.
DAVID E. SUNSTEIN
BY
AGENT

United States Patent Office 2,705,794
Patented Apr. 5, 1955

2,705,794

SIGNAL MODIFYING APPARATUS FOR ELIMINATING VARIATIONS AS A FUNCTION OF ONE OR MORE INDEPENDENT VARIABLES

David E. Sunstein, Cynwyd, Pa., assignor to Philco Corporation, Philadelphia, Pa., a corporation of Pennsylvania Application June 11, 1946, Serial No. 675,849

8 Claims. (Cl. 343—17.1)

The invention relates to improvements in electrical signal transducers having substantially logarithmic output versus input characteristics. More specifically it relates to methods and means whereby, when a logarithmic transducer is supplied with a signal which varies as a function of one or more independent variables and a certain functional relationship obtains between the value of the signal and the value of at least one of the independent variables, a correction signal can be combined with the output of the transducer to yield a resultant output signal which is independent of variations in the one variable but which otherwise is directly related to the input signal. By extension of this same principle, if certain functional relationships obtain between the value of the input signal and a plurality of independent variables, an output signal can be derived which is independent of variations in all of the independent variables to which the input signal is so related, but which is otherwise directly related to the input signal.

As described in my copending application, Serial Number 675,848, filed June 11, 1946, now U. S. Patent 2,663,015 issued December 15, 1953, it is desirable to utilize, in a radar receiver, an amplifier having a substantially logarithmic output versus input characteristic, whereby intelligence present in the received radar signal can be preserved and maximum discrimination among targets of different characteristics can be achieved.

It is known that, in a radar system in which the intensity of the transmitted signal is essentially constant, the strength of received signals reflected from target objects will vary as a function of the ranges of such objects. Methods and means are known in the art for eliminating this effect. Thus, for example, in an airborne system adapted to be used at a substantially constant height above the terrain, the effect may be substantially eliminated by using a so-called cosecant-squared transmitting antenna which radiates signals of different intensities in different directions according to the variation in distance from the airborne equipment to the terrain in these directions. In ground radar equipments, where such means can not be used to vary the intensity of the transmitted signal, resort may be had to varying the receiver sensitivity as a function of the time elapsed following the transmission of a pulse, as set forth in copending application of David B. Smith and William E. Bradley, Serial Number 509,288, filed November 6, 1943, now abandoned, and assigned to Philco Radio and Television Corporation. Thus reflections from more distant targets can be amplified to a greater extent than those from nearby targets.

I have discovered that, when using a logarithmic transducer in a radar receiver in the manner set forth in my aforementioned copending application, this equalization of the magnitudes of reflections from targets at different ranges can be achieved in a novel and exceedingly convenient manner, as will hereinafter be set forth. I have found that, by adding a suitable correction signal to the output from a logarithmic amplifier used in a radar receiving system, the desired result can be achieved. In a radar system transmitting a signal of essentially constant intensity, the received signal intensity E measured in units of potential will vary substantially in accordance with the relation:

$$E = \frac{K}{R^2}$$

where K is proportional to target reflectivity and R is the range of a target object from which a reflected transmitted signal is received.

If such a signal is applied to a logarithmic transducer whose output signal intensity $E_{out}$ is related to input signal intensity $E_{in}$ by the relation:

$$E_{out} = B \log E_{in}$$

where B is proportional to the sensitivity of the transducer, and may be either positive or negative depending upon the polarity of the output signal, and if, to the output signal from the transducer, there be added a correction signal $E_c$ whose variation with range is given by the expression:

$$E_c = 2B \log R$$

then the signal $E_r$ resulting after the performing of both of these operations will vary as a function of target reflectivity but not as a function of range in substantial accordance with the relation:

$$E_r = B \log K$$

Although one of the principal applications of my invention is to a radar system, the invention is applicable in any instance in which the input signal to a logarithmic amplifier varies in proportion to a real power (whether positive or negative) of an independent variable, and can be utilized to obtain an output signal which is independent of said variable. Thus, if the input signal to the logarithmic amplifier is given by the expression:

$$E = KR^n$$

where R is an independent variable, K may be any other independent variable or a constant, and n is any real number (positive or negative), the correction signal $E_c$ required to be added to the output signal to yield a resultant signal independent of R is given by the expression:

$$E_c = -n\, B \log R$$

The sign of $E_c$ will obviously be negative or positive depending on whether n is positive or negative.

The methods of and means for applying the principles of the invention will now be set forth with reference to the accompanying figures, from which other objects and advantages of the invention will become apparent.

Figure 1:
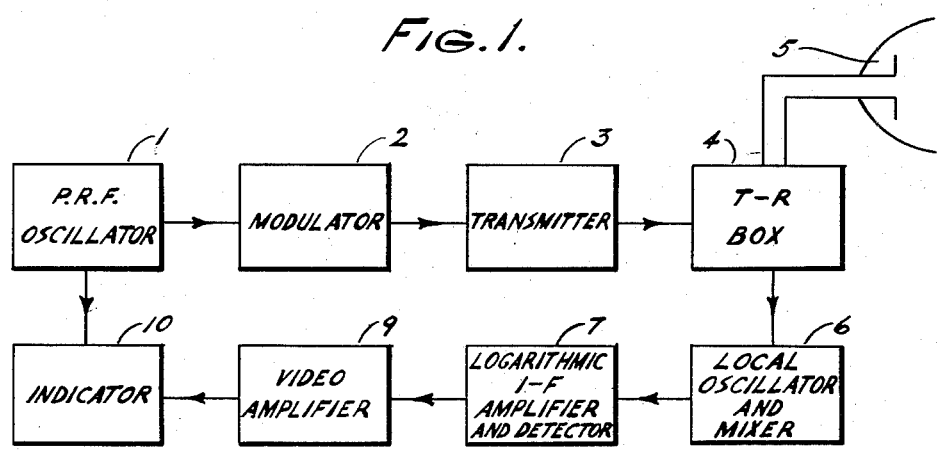
Figure 1 is a generalized block diagram of a radar system to which the invention is applicable.
Figure 2:
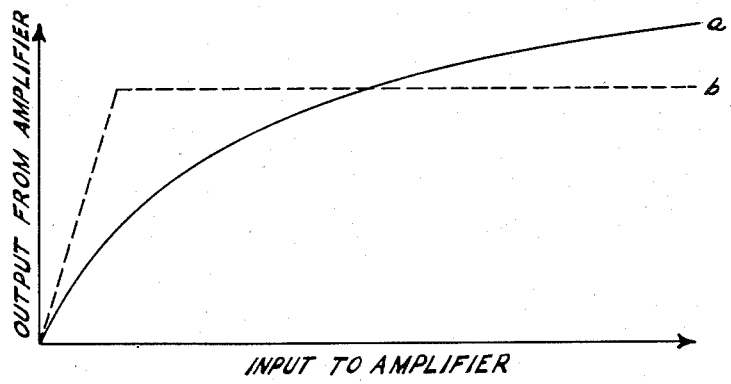
Figure 2 illustrates graphically the output versus input characteristic of the logarithmic amplifier and detector employed in the system of Figure 1, and compares it with the like characteristic of a conventional radar intermediate frequency amplifier.

In the radar system according to Figure 1, the P. R. F. oscillator 1 generates time-spaced pulse signals periodically recurrent at a rate which is primarily determined by the maximum range of target with which the equipment is to be used. These pulses are supplied through modulator 2 to control the generation, by transmitter 3, of pulses of high frequency energy preferably in the microwave range. These high frequency pulses are supplied through a conventional T-R box 4 to antenna 5, for transmission into space. Reflections therefrom target objects likewise may be intercepted by antenna 5, and are transmitted through T-R box 4 to local oscillator and mixer 6, the output of which may be supplied to logarithmic I.—F. amplifier and detector 7. The detected output from the latter is amplified in video amplifier 9 and supplied along with pulses from P. R. F. oscillator 1 to a suitable indicator 10 to provide an indication of either target range or direction, or both. In the system as above described, all of the components may be conventional with the exception of logarithmic amplifier and detector 7, which is designed to have a substantially logarithmic output versus input characteristic corresponding to that represented by the solid line $a$ in Figure 2, as contrasted with that for an ordinary intermediate frequency amplifier and detector as represented by the broken line $b$. More specifically, the logarithmic amplifier and detector may be of the form described in my aforementioned copending application.

It will, of course, be understood that since the transducer here involved functions both as an amplifier and as a detector, the expression $$E = \frac{K}{R^2}$$

hereinbefore given for the input signal to a radar receiving system, will correspond to the modulation envelope of the input intermediate frequency signal to the logarithmic amplifier and detector 7 of Figure 1. Also, if the logarithmic amplifier and detector is of the form described in my aforementioned copending application, the constant B, in the expression:

$$E_{out} = B \log E_{in}$$

for the characteristic of the logarithmic amplifier and in the expression:

$$E_c = 2B \log R$$

for the correction signal, will be negative in sign, and therefore the correction signal $E_c$ will be negative.

Figure 3:
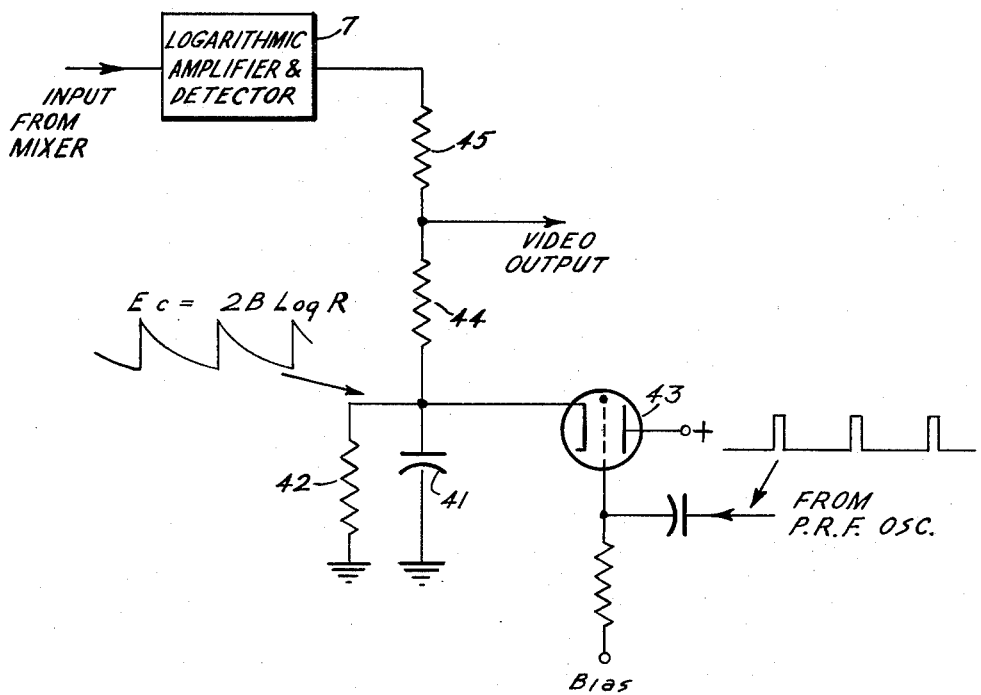
Figures 3 and 4 illustrate two representative arrangements, applicable to the radar system shown in Figure 1, for developing the correction signal hereinbefore mentioned and for combining it with the output signal from the logarithmic amplifier and detector.

The correction signal $E_c$ may be generated in any one of a variety of ways such as will occur to those skilled in the art. A close approximation to it, which I have found to be satisfactory for most applications, may, for example, be obtained by periodically charging a condenser in response to pulses from the P. R. F. oscillator (1 in Fig. 1), which control the transmission of pulses of high frequency energy by the radar equipment, the condenser being permitted to discharge at a predetermined rate through a resistor during the intervals between P. R. F. pulses. The signal appearing across the condenser will be the desired correction signal $E_c$. Apparatus for producing this signal, and for combining it with the output signal from the logarithmic I.—F. amplifier and detector of the radar system of Figure 1, is shown in Figure 3. Here condenser 41 is periodically charged in response to P. R. F. pulses supplied to the grid of gas tube 43 serially connected between the ungrounded terminal of condenser 41 and a source of positive potential. Resistor 42 shunts condenser 41 to discharge it during the intervals between P. R. F. pulses. The correction signal developed across condenser 41 is combined with the output from logarithmic amplifier and detector 7 (see also Figure 1) in a voltage adder comprising resistors 44 and 45, the magnitudes of which determine the ratio of the amplitudes of the two signals combined. The corrected output signal, which is essentially independent of variations in target range but which depends on the reflectivity of the target, as hereinbefore set forth, is derived at the junction of adder resistors 44 and 45.

Figure 4:
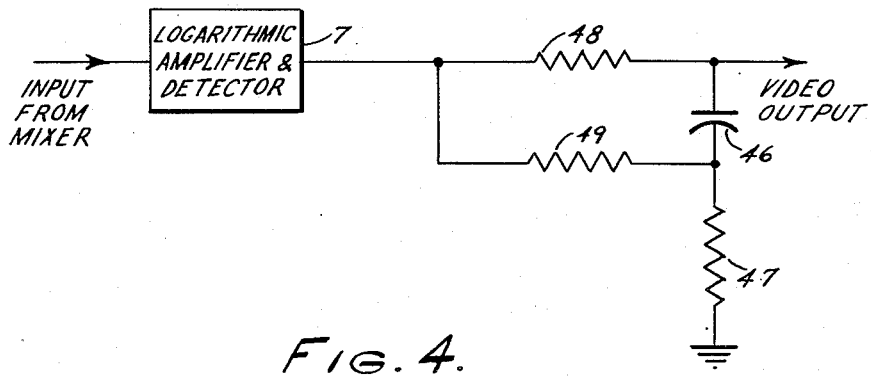

An alternative method of and means for deriving the logarithmic correction signal are illustrated in Figure 4. Here there is included, at the output of the logarithmic amplifier, a network comprising condenser 46 and resistors 47, 48 and 49, which is adapted to develop the desired correction signal $E_c$ in response to the output of the logarithmic amplifier and detector 7 and to combine it with said output to yield the resultant signal independent of variations in target range. In this network, condenser 46 and resistors 47 and 48 cooperate to emphasize the low frequency components in the output from amplifier 7 and may be adjusted, in accordance with well understood principles of network theory, to effect the desired correction. Resistor 49, shunting both condenser 46 and resistor 48, cooperates with resistor 47 to combine the output of logarithmic amplifier and detector 7 with the correction signal in the desired proportions.

Although, for simplicity in exposition, the invention has been described with reference only to the case in which it is desired to eliminate variation as a function of but one independent variable, to which the original signal bears a certain predetermined relationship, it is equally applicable as already mentioned hereinbefore and as will be apparent to those skilled in the art on reading this specification, to cases where it is desired to eliminate variation of the signal as a function of more than one variable, provided, of course, that the hereinbefore specified relationships exist. In the latter case, as will be apparent, the correction of the original signal can, if desired, be performed in several steps employing a plurality of cascaded logarithmic transducers, to the output of each of which a correction signal is added to eliminate certain of the variables. By this means separate outputs with different variables eliminated can be derived. Alternatively several variables may be eliminated in a single step by using a single logarithmic transducer and combining with its output a composite correction signal consisting of the sum of the prescribed logarithmic functions of the several independent variables desired to be eliminated.

Accordingly the scope of my invention is subject only to the limitations imposed by the appended claims.

I claim:

1. In an electrical signalling system, a source of a signal whose intensity varies at least as a real power of an independent variable, means deriving a signal which is substantially a logarithmic function of said first signal, and means additively combining with said derived signal a signal which is substantially a logarithmic function of said independent variable to obtain a signal which is substantially independent of said variable.

2. In an electrical signalling system, a source of a signal whose intensity varies as a function of a plurality of variables and as a real power of at least one of said variables, means deriving a signal which is substantially a logarithmic function of said first signal, and means additively combining with said derived signal a signal which is substantially a logarithmic function of said one variable to obtain a signal which is substantially independent of said one variable but varies as a function of said other variables in substantially the same way as said first signal.

3. In a radar system, a source of time-spaced pulse signals, means transmitting pulses of high frequency energy under control of said pulses and receiving reflections of said transmitted pulses from target objects, the intensity E of said reflections measured in units of potential varying substantially in accordance with the relation $$E = \frac{K}{R^2}$$

where K is proportional to the reflectivity of said targets and R is proportional to range, a signal transducer having an input circuit and an output circuit, supplied with said received reflections and having an output versus input signal intensity characteristic which is substantially $E_{out} = B \log E_{in}$, means responsive to said first-named pulses for generating a correction signal $E_c$ which varies substantially in accordance with the relation $$E_c = 2B \log R$$

and means additively combining said correction signal $E_c$ with the output from said transducer to yield a signal whose intensity varies with target reflectivity but is substantially independent of variations in range.

4. In a radar system, a source of time-spaced pulse signals, means transmitting pulses of high frequency energy under control of said pulses and receiving reflections of said transmitted pulses from target objects, the intensity E of said reflections measured in units of potential varying substantially in accordance with the relation $$E = \frac{K}{R^2}$$

where K is proportional to the reflectivity of said targets and R is proportional to range, a signal transducer having an input circuit and an output circuit, supplied with said received reflections and having an output versus input signal intensity characteristic which is substantially $E_{out} = B \log E_{in}$, means including a resistor and a condenser responsive to said first-named pulses for generating a correction signal $E_c$ which varies substantially in accordance with the relation $E_c = 2B \log R$, and means additively combining said correction signal $E_c$ with the output from said transducer to yield a signal whose intensity varies with target reflectivity but is substantially independent of variations in range.

5. In an electrical signalling system, a source of a modulated carrier wave signal, the instantaneous amplitude of whose modulation envelope varies at least as a real power of an independent variable, means deriving a detected signal which is substantially a logarithmic function of said modulation envelope, and means additively combining with said detected signal a signal which is substantially a logarithmic function of said independent variable to obtain a signal which is substantially independent of said variable.

6. An electrical signal modifying apparatus adapted to be supplied with an input signal whose intensity E varies as a function of at least one independent variable R substantially in accordance with the relation $E=KR^n$, where K may either be constant or vary independently and $n$ may have any real value, said apparatus being adapted to produce, in response to said input signal, an output signal whose intensity is substantially independent of variations in R, said apparatus comprising a transducer having input and output terminals and being adapted to produce in its output circuit a signal of the form $B \log E_{in}$, where B is a constant and $E_{in}$ is the signal supplied to its input, means for supplying said input signal to the input terminals of said transducer, means for producing a correction signal which is substantially of the form $-nB \log R$, and means for additively combining said correction signal with the signal derived from the output terminals of said transducer to yield a resultant modified signal.

7. An electrical signal modifying apparatus adapted to be supplied with an input signal whose intensity E varies as a function of at least one independent variable R substantially in accordance with the relation $$E=\frac{K}{R^2}$$

where K may either be constant or vary independently, said apparatus being adapted to produce, in response to said input signal, an output signal whose intensity is substantially independent of variations in R, said apparatus comprising a transducer having input and output terminals and being adapted to produce in its output circuit a signal of the form $B \log E_{in}$, where B is a constant and $E_{in}$ is the signal supplied ot its input, means for supplying said input signal to the input terminals of said transducer, means for producing a correction signal which is substantially of the form $2B \log R$, and means for adding said correction signal to the signal derived from the output terminals of said transducer to yield a resultant modified signal.

8. In an electrical signaling system, a source of a signal comprising substantially periodically recurrent pulses and a component whose intensity varies between successive pulse signals as a real power of the time elapsed following the occurrence of the earlier of said successive pulse signals, a signal transducer having its input supplied with said signal and which is operative to produce in its output a signal which is substantially logarithmically related to the signal supplied to its input, a serially connected resistor and condenser combination, a connection for applying the output from said transducer across said combination to develop across said condenser a potential which varies substantially logarithmically with time during intervals between successive pulses of said signal, a separate substantially resistive impedance, a connection for applying the output from said transducer across said impedance to develop across said impedance a signal which is substantially proportional to said output, and means connecting said separate resistor and said condenser in series to permit the additive combination of the potential developed across said condenser with the signal developed across said separate impedance.

References Cited in the file of this patent

UNITED STATES PATENTS

| Number | Name | Date |
|---|---|---|
| 2,014,509 | Roosenstein | Sept. 17, 1935 |
| 2,158,198 | Prescott | May 16, 1939 |
| 2,167,492 | Sproule | July 25, 1939 |
| 2,249,181 | Shepard | July 15, 1941 |
| 2,329,570 | Wellenstein | Sept. 14, 1943 |
| 2,403,527 | Hershberger | July 9, 1946 |
| 2,419,620 | Young | Apr. 29, 1947 |
| 2,422,069 | Bedford | June 10, 1947 |
| 2,423,671 | Wolff | July 8, 1947 |
| 2,435,960 | Fyler | Feb. 17, 1948 |
| 2,449,969 | Wright | Sept. 28, 1948 |
| 2,466,537 | DeVore | Apr. 5, 1949 |
| 2,498,381 | Smith | Feb. 21, 1950 |

OTHER REFERENCES

Radar System Engineering, 1947, by Ridenour MIT Series No. 1 (McGraw-Hill), pages 18 to 22.